3,329,509
FOOD WRAPPING MEMBRANE
Anatole Julius, Paris, France, assignor to Societe Civile des Produits Lifine, Saint-Cloud, Seine-et-Oise, France, a French company
No Drawing. Filed July 17, 1963, Ser. No. 295,806
Claims priority, application Luxembourg, Dec. 1, 1959, 37,997
1 Claim. (Cl. 99—171)

This invention which is a continuation-in-part of my pending application Ser. No. 47,151 filed Aug. 3, 1960, now abandoned, relates to food wrapping membranes such as sausage casings and to methods of producing them. It has long been suggested in the pork industry to provide artificial sausage casings as substitutes for the animal gut casings previously used. However, none of the artificial sheet materials heretofore proposed for this purpose have been entirely satisfactory.

Sausage meat after production in the form of sausages undergoes an aging process during which part of the water content of it must evaporate. Unless the sausage casing material is pervious to water vapor and permits such evaporation, moisture which is prevented from escaping causes an objectionable fermentation of the meat. Most artificial sausage casings heretofore used have comprised cellulose esters and ether base compositions such as xanthates and acetates, but these sheet materials are impermeable or insufficiently permeable to water vapor to permit the above-described evaporation. To obviate this, the impermeable sausage casings are usually perforated to permit the necessary evaporation, but this procedure is obviously unsatisfactory since it allows the ingress of dirt and germs and permits the sausage meat to be attacked by atmospheric agents.

Gelatine-base sausage casings have also been used. While gelatine is substantially permeable to vapor in its natural state, it does not in that state possess adequate tensile strength and has to be cured or tanned prior to use; such tanning or curing processes tend to destroy the permeability of the gelatine sheet and the resulting sausage coatings are therefore open to the same defects as above. It is difficult or impossible to strike a satisfactory compromise between the requisite strength and permeability characteristics because the tanning or curing effect increases with aging.

It is an object of this invention to provide an improved food wrapping membrane such as a sausage casing material or a membrane for wrapping fruit or vegetables, which will have adequate continuity and tensile strength while having the requisite degree of osmotic permeability to water vapor to permit the necessary evaporation of the moisture content in the food to proceed satisfactorily.

Another object of the invention is to provide an improved sausage casing or other food wrapping membrane which will be capable of shrinking during such evaporation so as at all times to fit snugly around the sausage rather than forming empty gaps therein.

A sausage casing or other food wrapping membrane according to the invention is produced from a filmogen (i.e. film-forming) material that is insoluble in water, and a hydrophilous, but not water-soluble, ingredient in admixture with said material.

Any filmogen may be used, provided that it is flexible and substantially impermeable. As filmogen, one may use for instance cellulose esters and ethers, e.g. cellulose acetate, ethyl-cellulose, cellulose aceto-butyrate, cellulose aceto-propionate and cellulose propionate; animal and vegetable proteins such as gelatine, fibrine, zeine, prolamine, albumine; synthetic resins such as vinyl resins (polyvinylchloride, acetate, or acetochloride, polyvinyl alcohol, polyvinyl formal, acetal or butyral for instance), vinyl copolymers (polyvinylidene chloride for instance), polyolefines (polyethylene or polypropylene for instance), and polyamids such as nylon.

Some of these substances, such as polyvinyl alcohol, are more or less water-soluble and should be made insoluble in water. This result may be obtained, as it is known, by a heat treatment; for instance, in the case of polyvinyl alcohol, it may be treated at 130° during 4 hours or at 180° during 10 minutes. The heat treatment may be effected on the filmogen material, on the mixture of filmogen material and hydrophilous ingredient, or even on the sausage casing or other membrane itself, after it has been produced.

As the hydrophilous and water insoluble ingredient, any of the following may be employed: starch and pecto-cellulose such as potato starch, rice starch, corn starch, tapioca, agar-agar, pectine, lichen and alginates; starch or pecto-cellulose is not needed to be pure and may be mixed with other substances. Certain vinyl resins may also be used such as polyvinyl alcohol and cellulose derivatives that are hydrophilous and insoluble in cold water, though they may be soluble in hot water, such as carboxymethylcellulose or cellulose glycolate. One may also use aluminum silicates, such as bentonite or montmorillonite.

The hydrophilic adjuvant, which is present in the film as grains or discrete particles dispersed through said film, constitutes water vapor permeable passages through the substantially impermeable film-forming material.

Where the film-forming material is an ester or a cellulose ether or ester, the outer surface of the casing may be coated with a composition comprising a portein and hydrophilous, non-water-soluble ingredient. Such protein overcasing imparts to the improved sausage casing an appearance simulating natural gut and permits the development of fungi such as penicillum. On cooking, the protein sets and retards the penetration of water into the meat during the cooking, thus preventing the excessive moisture content which otherwise tends to be introduced.

The proportion of the hydrophilous agent used is not critical, but a preferred range therefor is from about 7 to about 20% of the filmogen material.

The invention comprises a method of manufacturing the novel sausage casings or other food wrapping membranes, which method may comprise, mixing a water-insoluble filmogen material with at least one hydrophilous agent insoluble in water at ordinary temperature to provide a plastic mass which is of dry appearance at ordinary temperatures, and forming said mass into a sausage casing.

The formation of the plastic mass into a sausage casing or other food wrapping membrane may be effected by any one of known techniques, e.g. extrusion, or the mass may first be formed into a sheet by extrusion, rolling or centrifuging, and the sheet formed into a tubular casing.

In performing the above method a plasticizer is preferably added to the filmogen material; but the plasticizer is not necessary if the type of filmogen material, which is used, is plastic by itself. The plasticizer may comprise any of the following: glycerine, diacetine, triacetine, formalglycerine, glycerine esters, sorbitols, glycols, glycolesters such as methyl-glycol phthalate, butyl stearate or octyl phthalate, and more broadly any of the plasticizer compositions that can safely be used with food products, as well-known in the food industry, may be used for the purposes of the invention.

A water-soluble agent is desirably added to the mix. Such a substance will facilitate the entrance of water into the film and the coaction of the hydrophilous agent with said water. The water-soluble ingredient will then be removed from the casing on the sausage casing being dipped into a tub of water prior to filling it with sausage meat, as is the usual procedure.

As a water-soluble ingredient, sodium nitrate, sodium chloride, calcium chloride, sodium sulfate, hexamethylenetetramine, gum arabic, protides and the like, may be used.

If desired, any of the various fillers, dyes, pigments, stabilizers, vegetable and synthetic fibres, as are safe to use in the circumstances, may be added to the plastic mass.

The following examples are given as further illustration of the invention.

*Example 1*

A plastic mass is formed in a mixer from the following composition:

| | G. |
|---|---|
| Cellulose | 500 |
| Methylglycol phthalate | 340 |
| Triacetine | 25 |
| Glycerine | 50 |
| Starch | 75 |
| Soda sulfate | 5 |
| Calcium stearate | 5 | the resulting mix is then extruded in the usual way.

*Example 2*

Same procedure using the following composition:

| | G. |
|---|---|
| Ethyl cellulose | 575 |
| Butyl stearate | 60 |
| Methylglycol stearate | 275 |
| Glycerine | 50 |
| Palmitic acid | 15 |
| Agar agar | 25 |
| Potato starch | 100 |

*Example 3*

Same procedure using the following composition by passing the formed casing in a gelatine insolubilizing bath (containing for instance an aldehyde such as formaldehyde):

| | G. |
|---|---|
| Gelatine | 675 |
| Ethyleneglycol | 50 |
| Glycerine | 100 |
| Alfa fibre | 50 |
| Hexamethylenetetramine | 25 |
| Corn starch | 100 |

*Example 4*

Same procedure with the following composition:

| | G. |
|---|---|
| Cellulose acetate | 500 |
| Methyl phthalate | 200 |
| Triacetine | 40 |
| Glycerine | 100 |
| Sodium nitrate | 10 |
| Potato flour | 75 |
| Calcium stearate | 5 |
| Cotton fibre | 70 |

*Example 5*

Same procedure with the following composition:

| | G. |
|---|---|
| Vinyl acetochloride | 600 |
| Octyl phthalate | 200 |
| Glycerine | 100 |
| Polyvinylalcohol (Rhodoviol HS 10 or BS 10 for instance) | 100 |

*Example 6*

Same procedure by replacing in the composition of Example 1 starch by the same weight of bentonite.

*Example 7*

Same procedure with the following composition:

| | G. |
|---|---|
| Polyvinyl alcohol (Rhodoviol HS 100 made insoluble in water by a heat treatment) | 620 |
| Rice starch | 50 |
| Potato starch | 130 |
| Zeine | 50 |
| Starch acetate | 50 |
| Glycerine | 100 |

*Example 8*

Same procedure with the following composition:

| | G. |
|---|---|
| Polyvinyl alcohol | 700 |
| Bentonite | 150 |
| Glycerine | 100 |
| Zeine | 50 |

*Example 9*

Same procedure by replacing in the composition of Example 8, bentonite by the same weight of carboxymethylcellulose or cellulose glycolate.

*Example 10*

Same procedure with the following composition:

| | G. |
|---|---|
| Polyvinyl alcohol | 650 |
| Potato starch | 200 |
| Zeine | 50 |
| Glycerine | 100 |

*Example 11*

Same procedure with the following composition:

| | G. |
|---|---|
| Polyvinylidene chloride (Saran) | 600 |
| Potato starch | 100 |
| Rice starch | 100 |
| Zeine | 50 |
| Ethyl-phthalate | 50 |
| Glycerine | 100 |

*Example 12*

Same procedure with the following composition:

| | G. |
|---|---|
| Polyvinylidene chloride (Saran) | 700 |
| Bentonite | 150 |
| Zeine | 50 |
| Glycerine | 100 |

*Example 13*

Same procedure with the following composition:

| | G. |
|---|---|
| Polypropylene | 550 |
| Potato starch | 150 |
| Rice starch | 100 |
| Starch acetate | 100 |
| Glycerine | 100 |

*Example 14*

Same procedure with the following composition:

| | G. |
|---|---|
| Polypropylene | 550 |
| Potato starch | 150 |
| Bentonite | 150 |
| Triacetine | 50 |
| Glycerine | 100 |

Example 15

Same procedure with the following composition:

| | G. |
|---|---|
| Polyethylene (low pressure type) | 600 |
| Rice starch | 100 |
| Potato starch | 150 |
| Starch acetate | 50 |
| Triacetine | 50 |
| Glycerine | 50 |

Example 16

Same procedure with the following composition:

| | G. |
|---|---|
| Polyethylene (low pressure type) | 650 |
| Bentonite | 200 |
| Triacetine | 50 |
| Glycerine | 100 |

Example 17

Same procedure with the following composition:

| | G. |
|---|---|
| Polyamid (nylon type) | 600 |
| Starch acetate | 100 |
| Lactic acid | 50 |
| Rice starch | 100 |
| Potato starch | 100 |
| Triacetine | 50 |

Example 18

Same procedure with the following composition:

| | G. |
|---|---|
| Polyamid (nylon type) | 650 |
| Bentonite | 150 |
| Potato starch | 50 |
| Hexamethylenetetramine | 50 |
| Glycerine | 100 |

Example 19

Same procedure with the following composition:

| | G. |
|---|---|
| Polyvinyl acetal (low acetylation) | 650 |
| Potato starch | 150 |
| Zeine | 50 |
| Triacetine | 50 |
| Glycerine | 100 |

Example 20

Same procedure with the following composition:

| | G. |
|---|---|
| Vinyl acetate | 700 |
| Potato starch | 150 |
| Ethyl phthalate | 50 |
| Glycerine | 100 |

Example 21

Same procedure with the following composition:

| | G. |
|---|---|
| Vinyl acetochloride | 650 |
| Potato starch | 150 |
| Zeine | 50 |
| Ethyl phthalate | 50 |
| Glycerine | 100 |

Example 22

Same procedure with the following composition:

| | G. |
|---|---|
| Polyvinyl butyral | 700 |
| Potato starch | 150 |
| Rice starch | 50 |
| Ethyl phthalate | 50 |
| Glycerine | 50 |

Example 23

Same procedure by replacing in the composition of Example 22 polyvinyl butyral by the same weight of polyvinyl acetal or polyvinyl formal.

Example 24

Same procedure with the following composition:

| | G. |
|---|---|
| Polyethylene (low pressure type) | 700 |
| Bentonite | 150 |
| Zeine | 50 |
| Rice starch | 50 |
| Hexamethylenetetramine | 50 |

Example 25

Same procedure with the following composition:

| | G. |
|---|---|
| Cellulose aceto-propionate | 650 |
| Methylglycol phthalate | 120 |
| Glycerine | 50 |
| Rice starch | 100 |
| Potato starch | 75 |
| Calcium stearate | 5 |

Example 26

Same procedure with the following composition:

| | G. |
|---|---|
| Cellulose propionate | 600 |
| Ethyl phthalate | 70 |
| Methylglycol phthalate | 100 |
| Rice starch | 100 |
| Potato starch | 75 |
| Zeine | 50 |
| Calcium stearate | 5 |

Example 27

Same procedure with the following composition:

| | G. |
|---|---|
| Cellulose aceto-butyrate | 700 |
| Bentonite | 100 |
| Starch acetate | 50 |
| Methylglycol phthalate | 100 |
| Glycerine | 50 |

Example 28

Same procedure with the following composition:

| | G. |
|---|---|
| Cellulose aceto-propionate | 650 |
| Bentonite | 120 |
| Triacetine | 50 |
| Agar-Agar | 75 |
| Glycerine | 100 |
| Calcium stearate | 5 |

What I claim is:

A food wrapping membrane in the form of a self-supporting film consisting essentially of a mixture of
(1) a water insoluble, flexible, substantially impermeable, film-forming material selected from the group consisting of ethyl cellulose, cellulose acetate, cellulose aceto-butyrate, cellulose aceto-propionate, cellulose propionate, gelatine, fibrine, zeine, prolamine, albumine, polyvinyl chloride, polyvinyl acetate, polyvinyl aceto-chloride, water insoluble polyvinyl alcohol, polyvinyl acetal, polyvinyl formal, polyvinyl butyral, polyvinylidene chloride, polyethylene, polypropylene, and nylon; and
(2) a hydrophilic adjuvant selected from the group consisting of potato starch, rice starch, corn starch, tapioca, agar-agar, pectine, lichen, polyvinyl alcohol and alginates, said hydrophilic adjuvant being present in said mixture in an amount between approximately 7 and 20%, by weight, based on the amount of said film-forming material in the mixture; and (3) a water soluble ingredient selected from the class consisting of soluble salts of sodium and calcium, hexamethylene-tetramine, gum arabic, and protides, and being present in said mixture in an amount between approximately 1 and 5% based on the weight of said film-forming material.

References Cited

UNITED STATES PATENTS

| | | | |
|---|---|---|---|
| 2,824,092 | 2/1958 | Thompson | 260—117 |
| 2,961,322 | 11/1960 | Winterberg | 99—166 |
| 3,071,477 | 1/1963 | Klevens | 99—176 |
| 3,081,270 | 3/1963 | Horwarth | 260—751 |
| 3,123,483 | 3/1964 | McKnight | 99—176 |
| 3,137,664 | 6/1964 | Shulman et al. | 260—17.4 |

FOREIGN PATENTS 1,260,250   3/1961   France.

JOSEPH L. SCHOFER, *Primary Examiner.*

A. LOUIS MONACELL, *Examiner.*

L. M. SHAPIRO, J. A. SEIDLECK,
*Assistant Examiners*